Figure 1:
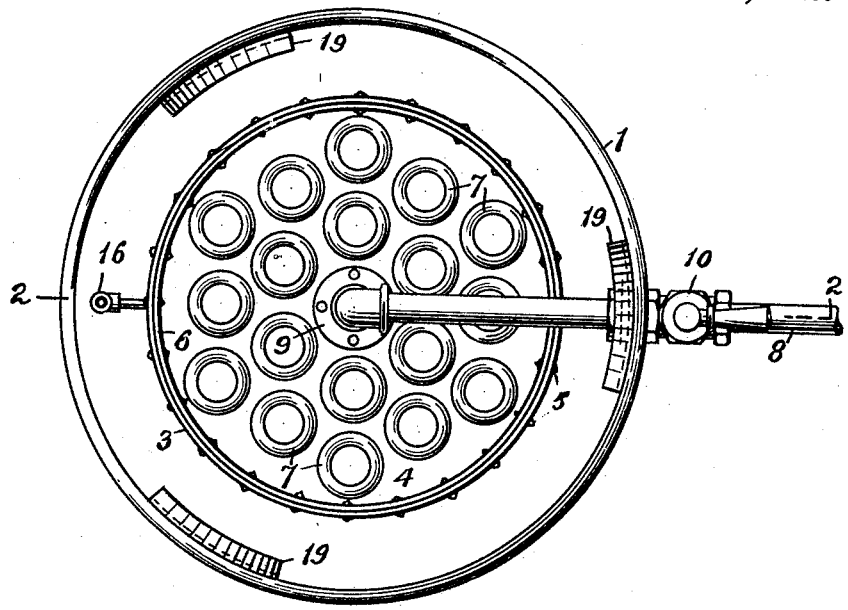

R. W. HARDIE.
AIR MOISTENER.
APPLICATION FILED JUNE 20, 1918.

1,343,718.

Patented June 15, 1920.

INVENTOR
Robert W. Hardie

UNITED STATES PATENT OFFICE.

ROBERT W. HARDIE, OF WHITE PLAINS, NEW YORK, ASSIGNOR TO R. W. HARDIE COMPANY, INC., A CORPORATION OF NEW YORK.

AIR-MOISTENER.

1,343,718.     Specification of Letters Patent.     Patented June 15, 1920.

Application filed June 20, 1918. Serial No. 241,080.

*To all whom it may concern:*

Be it known that I, ROBERT W. HARDIE, a citizen of the United States, and resident of White Plains, in the county of Westchester and State of New York, have invented new and useful Improvements in Air-Moisteners, of which the following is a specification.

This invention relates to that class of air moisteners wherein water is vaporized into an indoor atmosphere by means of heat, to raise the relative humidity of said atmosphere; and has for its main object to provide a device of that character, that is simple in construction, effective in operation, and durable and economical in use for enabling vapor, arising from a water containing receptacle to be diffused into an indoor atmosphere in a facile, economical, and satisfactory manner.

In some forms of air moisteners, water is sprayed into the atmosphere in fine jets under pressure, and in some instances the water pressure is supplemented by the action of fans to force the added particles of water into the atmosphere, and create an active movement of the air in taking up the water so sprayed into the atmosphere.

In such cases the active agents are the water pressure and the fans acting upon the added spray and the atmosphere. But in the class of air moisteners in which the water is first heated and converted into vapor, the vapor is not the active agent and has no power to force itself into the atmosphere. On the contrary the active agent in so doing is the atmosphere, and the added vapor is acted upon by the atmosphere itself.

The active agent of the air in such cases consists in the drying or absorbing power of the air, which is the difference between the per cent. of humidity actually in the atmosphere at a given temperature, and the maximum amount, or the point of saturation of the air, at that same temperature; the higher the temperature the more moisture the air will hold, and the lower the temperature the less moisture it will hold, expressed in absolute terms.

It is because of the limited capabilities, and changeable capacity of the air for taking up and maintaining additional moisture, particularly in a substantially still indoor atmosphere, as compared with a freely moving outdoor atmosphere that it becomes very difficult to provide means for satisfactorily increasing the relative humidity of an indoor atmosphere by vaporizing water into the atmosphere.

A further difficulty is found in this connection. When water is vaporized into an indoor atmosphere it is necessarily introduced into the atmosphere at one or more points or stations and that additional moisture must not only be taken up and absorbed by the drying power of the air, but it must also become spread throughout the indoor air by virtue of what is known as the law of diffusion of gases, otherwise the added vapor would become localized and condense at or near the station where it was released.

Vapor arising from the surface of a body of heated water within a receptacle, unless restrained in some manner, will leave the receptacle in a dense column or cloud ascending several feet in height; on the other hand if the release of the vapor from the receptacle be unduly restrained, then a sufficient amount of vapor will not be released from the receptacle, and the purpose of the device will not be accomplished.

When the vapor arises from a receptacle in a cloud or column as stated, it is impossible for the air to get at the interior of the cloud or column to absorb the vapor, and as the air only attacks the outer portion of the volume of vapor a considerable part of the vapor condenses in the vicinity of the device and is not taken up by the atmosphere.

It is therefore among the objects of this invention, to provide means for restraining to a desirable extent, the liberation of vapor from a vaporizing receptacle, and at the same time provide for the free delivery of the desired amount of vapor from such a receptacle, and particularly in providing means for causing the vapor to leave the receptacle in the form of a ring or band with an air space within said band, so that the air with its absorbing power may attack or operate upon a greater area of the vapor and more readily absorb a maximum amount thereof, than would be the case if the vapor arose from the receptacle in the form of a cloud or column.

Where as in the use of devices of this class, an abnormal amount of vapor is released into an indoor atmosphere a greatly increased burden is imposed upon the air in the immediate vicinity of the device in taking up that extra amount of vapor, and to that end this invention includes as one of its objects and purposes to provide means for increasing the temperature of the indoor air in the immediate vicinity of the point of delivery of the vapor into the atmosphere, so as to increase the drying power of the air and its consequent capacity for absorbing moisture, and also for the purpose of protecting the water in the receptacle, and the vapor, from drafts of air that would otherwise interfere with the full and free production of vapor and cause the vapor to condense before being absorbed by the atmosphere.

At different seasons of the year and at different times in the same season, and under different conditions of use, the quantity of vapor desired is different from what is desired and required at other seasons, other times, and under other conditions.

A further object of the invention is to provide means for controlling to the desired extent the quantity of vapor arising out of the receptacle, and to that end and for the other purposes hereinbefore mentioned a spreading and radiating plate is provided to restrain the outlet of the vapor to the desired extent, and to heat the air above the receptacle.

For the purpose of regulating the quantity of vapor delivered from the receptacle, the spreading and radiating plate is preferably made adjustable vertically relative to the top of the receptacle, so as to vary the width of opening between said plate and the top of said receptacle, and consequently the amount of vapor passing through said opening.

It is frequently necessary in connection with moistening air, particularly in a sick ward, or room, to diffuse into the atmosphere with the vapor, medicinal preparations, such as benzoin for patients suffering from asthmatic and bronchial affections, and one of the purposes and objects of the invention is to provide means for so doing, and to that end the spreading and radiating plate is dished on its upper surface to hold water and such medicinal preparations so that they may be together vaporized into the atmosphere to be inhaled by the patient.

A further object and purpose of such a construction is that by making the spreading and radiating plate of sheet metal, the upper surface may be dished and the under surface may be correspondingly inclined downwardly and inwardly from its outer margin and the water of any vapor that condenses on the under side of the heating plate will thereby drip back into the receptacle.

With the foregoing, and other objects in view hereinafter stated, the invention consists in the novel construction, combination, and arrangement of parts hereinafter more specifically described, and illustrated in the accompanying drawings, wherein is shown the preferred embodiment of the invention, but it is to be understood that changes, variations, and modifications may be resorted to without changing the scope of the invention.

In describing the invention in detail, reference is had to the accompanying drawings, which form a part of this specification, and wherein like reference characters denote corresponding parts throughout the several views.

In the drawings is shown a main water containing receptacle and a heater for vaporizing the water, but it is to be understood that the invention is not dependent upon nor essentially related to any particular means for heating the water in the main receptacle; any desired means or method of heating the water in the main receptacle is sufficient for the purpose of the invention. And particularly it is not necessary that the heater be arranged within the main receptacle, nor is it necessary that the heater be attached to the receptacle.

Figure 2:
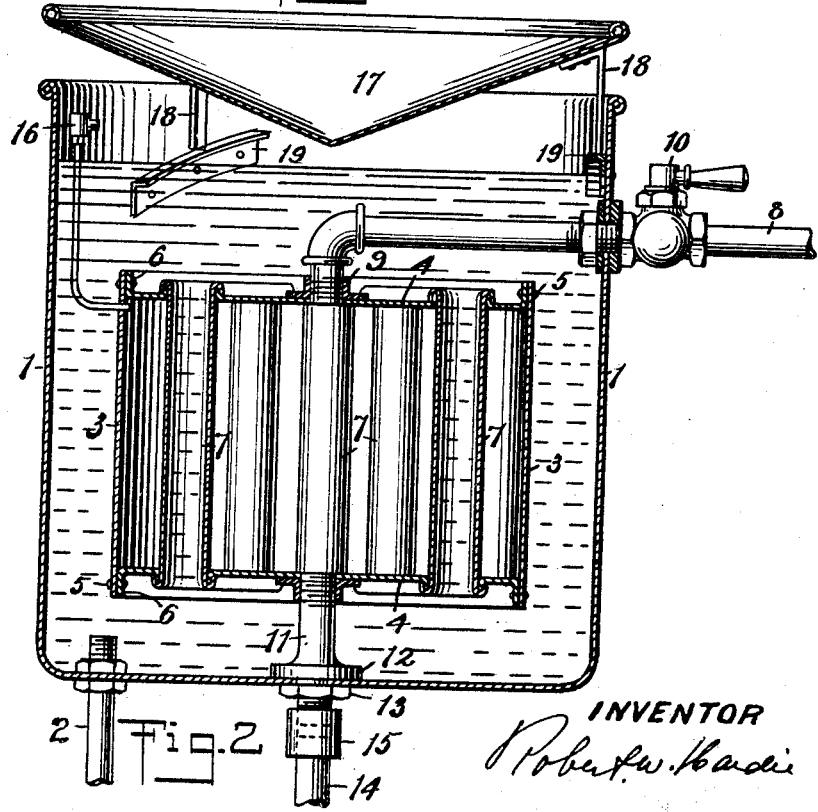

In the drawings: Figure 1 is a plan of an open-topped receptacle having a heater therein, and a tubular connection attached to the heater and wall of the receptacle. Fig. 2 is a vertical cross section of the receptacle and heater shown in Fig. 1 taken on the line 2—2, and a spreading and radiating plate shown in cross section mounted upon the receptacle.

As illustrated in the drawings 1 represents an open-topped main receptacle designed to hold the water to be vaporized. Water may be placed in the receptacle by hand or by means of a pipe 2 opening into the interior of said receptacle, and connected with the water supply pipe of a building or in any other suitable manner.

A heater is shown arranged within the main receptacle having an outer shell or body 3, and oppositely disposed heads 4 provided with flanges 6, that are secured to the shell by means of rivets 5 or otherwise. The heads are provided with tubes 7 secured to the heads in any suitable manner. An inlet or supply pipe 8 connected with a source of heat supply communicates with the interior of the heater and may be connected with the heater by means of a flanged coupling 9 threaded to receive an extension of the pipe 8.

An inlet valve 10 may be connected with the supply pipe 8.

A tubular connection 11, is shown attached to the lower end of the heater and is provided on its lower end with a supporting flange 12, and an extension that projects through the bottom of the main receptacle and engages a clamping nut 13. The extension of the tubular connection is shown connected with a return pipe 14 by means of a coupling 15.

In operation, the receptacle is filled with water preferably to a level above the top of the heater, and the heating medium, either steam, vapor, or hot water, enters the heater through the pipe 8 and surrounds the tubes 7, and thereby radiates heat into the water in the receptacle through the tubes and the shell of the heater and converts the water into vapor.

As the vapor leaves the main receptacle it comes in contact with a spreading and radiating plate 17, conforming in outline, but not necessarily in outer dimensions, with the top of the receptacle and is thereby arrested and directed outward between the said plate and the top of the receptacle and passes out into the atmosphere in the form of a ring or belt with an open space within the ring, so that the air within the ring as well as the air outside of the ring or belt of vapor may absorb the vapor arising from the receptacle and diffuse it into the atmosphere far more readily than is possible if the vapor arises from the receptacle in mass form.

The spreading and radiating plate 17 is preferably of inverted conical formation, and provided with arms 18 that are supported at their ends upon inclined ways 19, secured to the interior surface of the wall of the receptacle. The arms 18 by bearing against the interior of the receptacle hold the plate 17 against lateral displacement.

As the plate is turned on its axis it is raised or lowered, and the opening between the plate and the top of the receptacle is thereby enlarged or contracted.

The plate serves as a cover to the receptacle, and prevents dust and foreign matter from falling onto or into the water in the receptacle, and when the device is not in use the plate may be brought down close to the upper wall of the receptacle and serve as a closure.

The under surface of the plate is inclined downward and inward from its outer margin, and any moisture that condenses on that surface will flow toward the center of the plate and drop back into the receptacle.

One of the important functions of the spreading and radiating plate is to regulate the amount of vapor passing out of the receptacle; the greater the distance there may be between the plate and the top of the receptacle, the more vapor will pass out of the receptacle.

The plate moreover serves as a radiating plate and raises the temperature of the air surrounding the top of the air moistener, increasing the capacity of that air for absorbing moisture and aiding greatly in diffusing into the atmosphere the vapor arising from the receptacle.

The upper surface of the spreading and radiating plate is dished and thereby becomes an auxiliary or secondary receptacle adapted to hold water or other liquids such as medicinal preparations, which may be heated and vaporized by the heat from the water in the receptacle and the vapor arising therefrom.

The spreading and radiating plate 17, is shown as circular in outline to conform to the contour of the upper part of the main receptacle. The particular shape or outline of the main receptacle is not essential, nor is it essential that the spreading and radiating plate be disk shaped or circular in outoutline. The outline of said plate is best made to conform to the outline of the top of the main receptacle whatever be the outline thereof. It is not essential moreover that the means for mounting the spreading and radiating plate on the receptacle, and for providing for the vertical adjustment of said plate relative to the top of the wall of the receptacle, be of the construction herein shown and described.

What I claim as new and desire to secure by Letters Patent is:

1. An air moistener comprising an open-topped water retaining receptacle, means for vaporizing the water in the receptacle, a spreading and radiating plate extending over the top of said receptacle, and means for adjusting the plate vertically relative to the top of the wall of the receptacle.

2. An air moistener comprising an open-topped water retaining receptacle, means for vaporizing the water in the receptacle, a spreading and radiating plate having its outer margin spaced from the top of the wall of said receptacle, inclined ways secured to the wall of said receptacle, and means connected with said plate bearing on said ways to vary the space between the outer margin of said plate and the top of the wall of said receptacle.

3. An air moistener comprising an open-topped water retaining receptacle, means for vaporizing the water in the receptacle, and a spreading and radiating plate detachably and adjustably mounted on said receptacle with its outer margin normally spaced from the top of the wall of said receptacle, and adapted to be removed from said receptacle or brought into close proximity with the top of said wall to serve as a closure for said receptacle.

ROBERT W. HARDIE.

Witnesses:
MARTHA DALY,
WILLIAM MILLER.